United States Patent [19]

Markovics

[11] 4,293,254
[45] Oct. 6, 1981

[54] COUNTERSINKING TOOL WITH REMOVABLE CUTTING INSERTS

[75] Inventor: Michael Markovics, Lindenhurst, Ill.

[73] Assignee: Everede Tool Company, Chicago, Ill.

[21] Appl. No.: 76,175

[22] Filed: Sep. 17, 1979

[51] Int. Cl.³ .......................... B23B 51/00; B26D 1/12
[52] U.S. Cl. .................................. 408/229; 408/219; 407/40
[58] Field of Search .............. 408/219, 220, 221, 222, 408/223, 224, 225, 226, 227, 228, 229, 230, 231, 232, 233, 238, 239, 713; 407/33, 40, 42, 47, 48, 51

[56] References Cited

U.S. PATENT DOCUMENTS

| 393,463 | 11/1888 | Edison | 408/233 |
|---|---|---|---|
| 1,049,124 | 12/1912 | Merriam . | |
| 1,521,467 | 12/1924 | Morgan | 407/48 |
| 1,940,220 | 12/1933 | McGrath | 408/224 |
| 2,010,257 | 8/1935 | Fehse | 408/229 |
| 2,041,587 | 5/1936 | Beard | 407/33 |
| 2,242,821 | 5/1941 | Fanslow | 408/231 |
| 2,357,088 | 8/1944 | Curtis | 407/47 |
| 2,437,364 | 3/1948 | Smith . | |
| 3,354,526 | 11/1967 | Erkfritz | 407/40 |
| 3,955,259 | 5/1976 | Gustafsson | 407/42 |
| 4,199,284 | 4/1980 | Kress et al. | 407/51 |

FOREIGN PATENT DOCUMENTS 2437126  6/1975  Fed. Rep. of Germany .

Primary Examiner—Harrison L. Hinson
Attorney, Agent, or Firm—Merriam, Marshall & Bicknell

[57] ABSTRACT

A countersinking tool comprising a holder with at least two removable cutting inserts for countersinking relatively large holes. The holder has a locating recess and a seating surface for each insert, and is cut away at various parts to facilitate the countersinking operation. The inserts may be cut away at one part to facilitate the mounting of a plurality of inserts on the holder.

15 Claims, 7 Drawing Figures

FIG.1
FIG.3
FIG.2
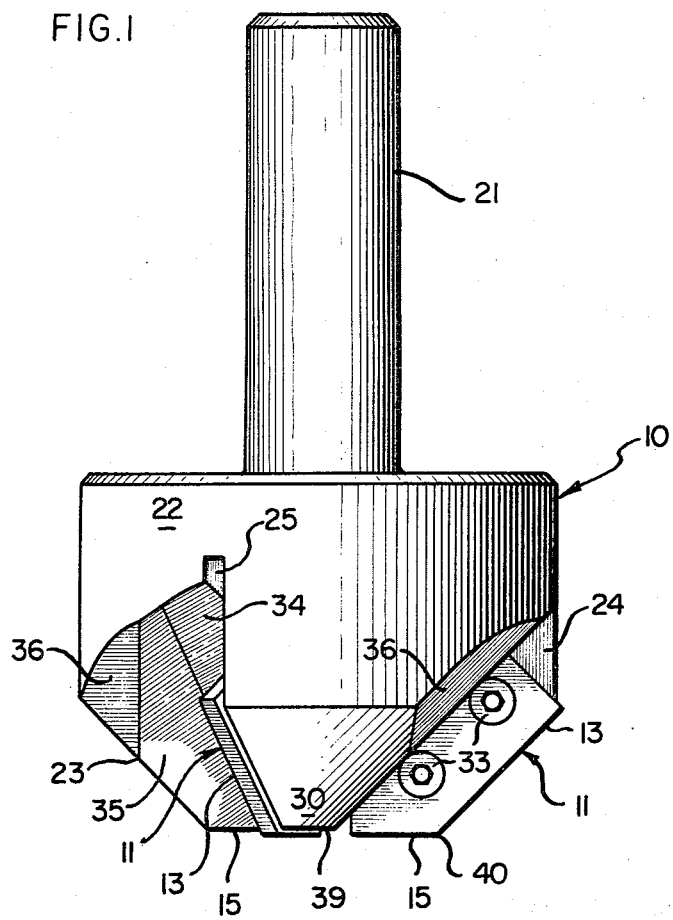
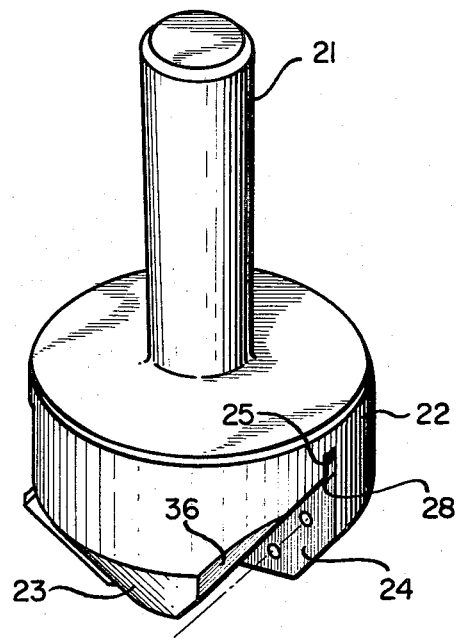
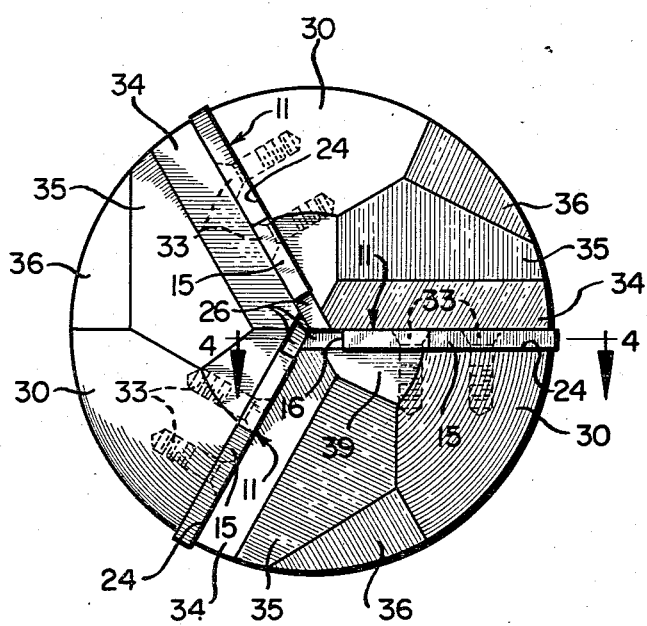

COUNTERSINKING TOOL WITH REMOVABLE CUTTING INSERTS

BACKGROUND OF THE INVENTION

The present invention relates generally to metal cutting tools and more particularly to a countersinking tool having removable cutting inserts.

Conventional countersinking tools for countersinking relatively large holes (e.g., one inch or larger in diameter before the countersinking operation) generally comprise a monolithic, unitary tool having six or seven integral cutting edges machined or ground into the tool along a downwardly tapering, frusto-conical portion of the tool. Each cutting edge is ground with a predetermined rake which is the angle defined by the two surfaces which converge to form the cutting edge. The particular angle or rake ground on the edge depends upon the material which is to be cut by the cutting edge. Different materials (e.g., different metals) require different rakes for optimum cutting thereof. Similarly, for a given material, such as steel, different hardnesses thereof require different rakes for optimum cutting.

A conventional countersinking tool, with the cutting edges constituting an integral part thereof, may have cutting edge rakes which are optimum for one given material but which are less than optimum for another given material, and, to provide optimum cutting on the other given material, the cutting edges must be changed. For conventional countersinking tools with integral cutting edges, this means removing the entire countersinking tool from the machining head which imparts rotation to the tool and replacing it with another countersinking tool having integral cutting edges with the desired rakes.

Because it is not convenient to change the countersinking tool every time a different rake is required, it is not unusual for a countersinking tool to be used indiscriminately, regardless of the rake which happens to be ground into the integral cutting edges and regardless of the material which is undergoing countersinking. In order to perform an adequate cutting operation under these circumstances, it is necessary to provide the countersinking tool with six to eight cutting edges.

Moreover, when the integral cutting edges on a conventional countersinking tool wear out, the entire countersinking tool must be subjected to a regrinding operation which is a relatively complicated, time-consuming and expensive operation. This regrinding operation must be performed on a special machine which will accommodate the entire countersinking tool. Similarly, to change the rake on the integral cutting edges of the tool requires removing the entire tool from the machining head and regrinding the cutting edges using the special machine described in the preceding sentence.

The cutting edges on a countersinking tool can be reground only a limited number of times. Eventually, the edges can be reground no more and, in the case of a conventional countersinking tool with integral cutting edges, the entire tool must be thrown away and replaced, a procedure which is relatively expensive.

SUMMARY OF THE INVENTION

A countersinking tool in accordance with the present invention eliminates the drawbacks and difficulties of the conventional countersinking tools described above. The present countersinking tool comprises a permanent holder on which is removably mounted a disposable cutting insert. The desired rake is ground into the cutting edge of the insert. When a different rake is required, the insert is removed from the holder and replaced by another insert, one having the desired rake.

When the cutting edge requires regrinding, one need merely remove the insert from the holder and regrind the edge on the insert. A special machine for accommodating the entire tool (holder plus insert) is not required because the insert can be removed from the holder for regrinding. Regrinding a cutting edge on a removable insert is many times faster (e.g., 20 times faster) than regrinding an integral edge on a unitary countersinking tool.

Similarly, when the cutting edge has been reground so often that further regrinding is impossible, one need merely dispose of the insert alone. The holder can be used with a new insert and need not ever be disposed of merely because cutting edges can no longer be reground.

Because, with a countersinking tool in accordance with the present invention, the rake can be readily changed, the countersinking tool need be provided with only three cutting edges, compared to the six to eight cutting edges required on conventional countersinking tools on which the rakes were not readily changeable.

To prevent chattering by the countersinking tool during operation, a minimum of two cutting edges is required, but three cutting edges will suffice as the maximum number required for optimum countersinking operations in virtually all situations.

As noted above, a countersinking tool in accordance with the present invention is for countersinking a relatively large hole (e.g., at least one inch in diameter before countersinking). Because the hole is relatively large, the countersinking operation is generally not a precision operation, and the tool is, accordingly, not a precision tool, nor need it be. This is in contrast to tools which are intended to countersink relatively small holes, such as holes for fasteners (e.g., rivets) where the countersunk portion of the hole is to accommodate a frusto-conical fastener head.

The structural and dimensional features which impart to the countersinking tool of the present invention the features, characteristics and advantages described above are set forth in greater detail below. Other features and advantages are inherent in the structure claimed and disclosed or will become apparent to those skilled in the art from the following detailed description in conjunction with the accompanying diagrammatic drawings.

BRIEF DESCRIPTION OF THE DRAWING

FIG. 1 is a side view of a countersinking tool with removable cutting inserts constructed in accordance with an embodiment of the present invention;

FIG. 2 is an end view from the cutting end of the countersinking tool of FIG. 1;

FIG. 3 is an exploded perspective of the countersinking tool;

DETAILED DESCRIPTION

FIGS. 1-5 depict one embodiment of a countersinking tool constructed in accordance with the present invention and comprising a rotatable holder 10 and a plurality of removable cutting inserts 11, 11.

Figure 4:
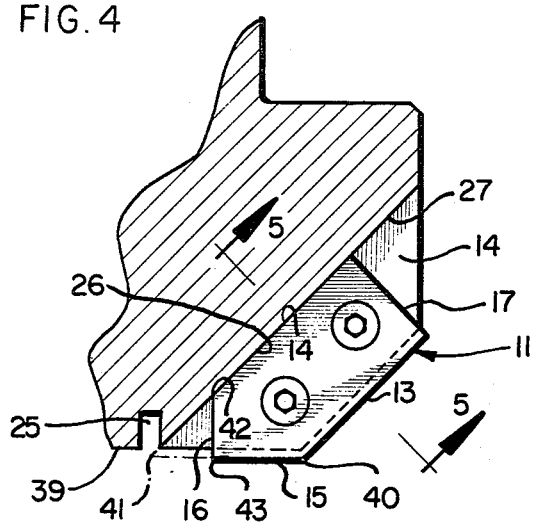
FIG. 4 is a sectional view taken along line 4—4 in FIG. 2.
Figure 5:
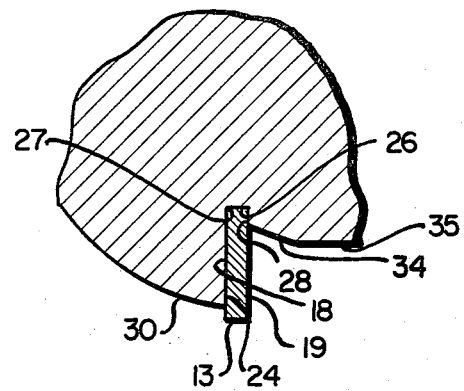
FIG. 5 is a sectional view taken along line 5—5 in FIG. 4.

Referring to FIGS. 3-5, each insert 11 comprises an outer cutting edge portion 13 and an inner end portion 14 opposite and parallel to cutting edge portion 13 and comprising means for seating on a locating surface. Adjacent cutting edge portion 13 is a forward end portion 15. Extending between forward end portion 15 and inner end portion 14 is a first connecting portion 16, and extending between cutting edge portion 13 and inner end portion 14 is a second connecting portion 17. The insert also comprises a first flat surface 18 comprising means for seating on a seating surface and a second flat surface 19 opposite the first flat surface.

Referring to FIGS. 1-5, holder 10 comprises a shank 21 integral with a cylindrical portion 22 integral with a frusto-conical portion 23 extending from cylindrical portion 22. Shank 21, cylindrical portion 22 and frusto-conical portion 23 are axially aligned.

Machined into frusto-conical portion 23 and cylindrical portion 22 are a plurality of seating surfaces 24, 24 one for each of the inserts 11. Each seating surface 24 lies in a plane parallel to the axis of holder 10 and extends inwardly from the periphery of the holder to an inner end of the seating surface. Located at the inner end of seating surface 24 is a locating recess 25 having a locating surface 26 substantially perpendicular to seating surface 24 and joining the latter along an interior edge 27 also constituting the inner end of seating surface 24 (FIGS. 4 and 5). Each locating recess 25 also comprises a further surface 28 parallel to, spaced from and facing a respective seating surface 24 in the same recess. As shown in FIG. 5, surface 28 has a dimension, in an inward direction on holder 10, substantially less than the dimension of seating surface 24 in that direction, and surface 28 terminates inwardly of fasteners 33 (see FIG. 1).

Each locating recess 25 comprises structure for receiving the inner end portion 14 of a respective corresponding insert 11 and for cooperating with the corresponding seating surface 24 to mount the insert in a disposition in which the insert's cutting edge portion 13 defines an inverted frusto-conical surface of revolution when holder 10 is rotated about its axis. When the holder is so rotated, the surface of revolution defined by cutting edge portion 13 lies outside the surface of revolution defined by frusto-conical portion 23.

Frusto-conical portion 23 has a plurality of peripheral parts 30, 30 each adjacent a respective seating surface 24 and each extending in an angularly trailing direction from its adjacent seating surface when holder 10 is rotated in a countersinking operation (FIGS. 2 and 5). Each peripheral part 30 is sufficiently indented relative to the cutting edge portion 13 on the adjacent seating surface 24 to accommodate axially advancing movement of frusto-conical portion 23 in a countersunk hole during a countersinking operation. Absent this indentation of peripheral part 30, there is a danger that that part of the frusto-conical portion which immediately trails the cutting edge portion could rub against the side of the countersunk hole during the countersinking operation.

Securing each insert 11 to holder 10 are a plurality of detachable threaded fasteners 33, 33 (e.g., allen head screws) extending through each insert and its corresponding seating surface 24 into internally threaded holes in the holder. Although threaded fasteners, such as 33, are slower to install and remove than certain other types of fasteners, such as cam-action fasteners, the threaded fastener is sturdier and can be quite readily installed and removed when, as will be described below, the holder is designed to provide ready access to the fasteners. Extending from each seating surface 24, in an angularly leading direction, is a cut-away part comprising a first cut-away surface 34 sufficiently indented from the periphery of holder 10 to enable a tool (e.g., an allen head wrench) to obtain ready access to fasteners 33, 33. If necessary, in cases where the holder is relatively small so that all of surface 34 could not be cut away sufficiently to provide ready access to fasteners 33, 33, grooves can be milled in surface 34 to a depth sufficient to provide such access to the fasteners.

In addition to surface 34, the cut-away part also comprises a second cut-away surface 35 extending from first cut-away surface 34 in an angularly leading direction and sufficiently indented from the periphery of holder 10 to facilitate chip clearance during a countersinking operation. A third cut-away surface 36 is located, in part, between second cut-away surface 35 and the peripheral part 30 adjacent the next seating surface. Third cut-away surface 36 is also located, in part, between the second cut-away surface 35 and the periphery of cylindrical portion 22. Third cut-away surface 36 constitutes means for eliminating sharp angular edges between the surfaces adjoining third cut-away surface 36, thereby protecting the hands of a worker handling the tool. In certain embodiments, cut-away surfaces 34 and 35 may be merged into a single surface, and, in some embodiments, third cut-away surface 36 need not be employed.

As noted above, each locating recess 25 comprises a surface 28, and this surface terminates at the first cut-away surface 34. Surface 28 engages a portion of the second flat surface 19 of cutting insert 11 adjacent the inner end portion 14 of the insert and prevents the force exerted against the insert by the metal work piece undergoing countersinking from breaking the insert loose at detachable fasteners 33.

Referring to FIGS. 1-4, frusto-conical portion 23 tapers away from cylindrical portion 22 toward a terminal end 39 of holder 10.

Referring to FIGS. 2 and 4, each of the seating surfaces 24 extends substantially radially from the axis of the holder. The locating surfaces 26, 26 and the recesses 25, 25 converge toward each other and the recesses meet at terminal end 39 of holder 10. The cutting edge portion 13 on each insert extends from a terminal end 40 thereof, at the terminal end 39 of the holder, angularly outwardly toward cylindrical portion 22 of holder 10. Each insert forward end portion 15 extends, along terminal end 39 of holder 10, from the terminal end 40 of cutting edge portion 13 substantially radially inwardly toward an extension of inner end portion 14 of insert 11. Each insert inner end portion 14 lies along a respective one of the converging locating surfaces 26, 26 of recesses 25, 25 with the inner end portions 14, 14 of the inserts being mutually converging.

Referring to FIG. 4, each insert 11 is cut away from the projected junction (shown in dash-dot lines at 41) of extensions of forward end portion 15 and inner end portion 14. This cut-away is to accommodate the converging inner end portions of the inserts at the terminal end 39 of the holder. The inserts are cut away from point 41 back to first connecting portion 16. Absent such a cut-away, the converging inner end portions 14, 14 of the inserts would interfere with each other at the terminal end of the holder, and the holder would not accommodate three inserts as shown. More specifically, the distance from junction 40 of cutting edge portion 13 and forward end portion 15 to junction 41 of the extensions of the forward and inner end portions 15, 14, respectively, is greater than the radius of the holder at its terminal end; and for this reason the inserts are cut away.

Generally, no more than three inserts are required to perform a satisfactory countersinking operation for holes having a countersunk portion with a diameter up to about 4 inches. This is because the holder can be readily provided with inserts having the proper cutting edge rake for the material undergoing countersinking. If, prior to the start of the countersinking operation, the inserts on the holder do not have the optimum rake for the material to be countersunk, the inserts can be readily changed to those which do have the optimum rake. Accordingly, no more than three inserts are required to do the required countersinking operation, in contrast to a situation wherein six or seven cutting edges would be required if the optimum rake were not already ground into the cutting edges of the countersinking tool.

In the embodiment illustrated in FIGS. 1-5, the forward end portion 15 of each insert has a dimension which is less than the radius of holder 10 at terminal end 39. In such a case, the holder can accommodate 3 inserts.

As noted above, the embodiment of FIGS. 1-5 is intended for use in the countersinking of a hole having a relatively large starting diameter (e.g., 2 inches or more). When a smaller hole is to be countersunk (e.g., 1-2 inches starting diameter), the holder must be smaller; and in such a case, only two inserts can be accommodated on the holder. This situation is reflected in the embodiment shown in FIGS. 6 and 7.

Figure 6:
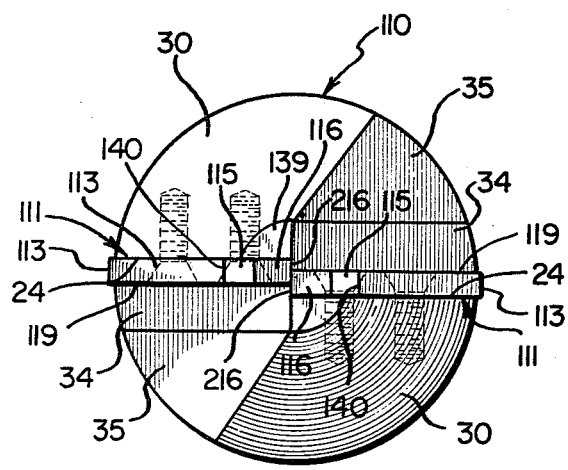
FIG. 6 is an end view from the cutting end of another embodiment of a countersinking tool constructed in accordance with the present invention.
Figure 7:
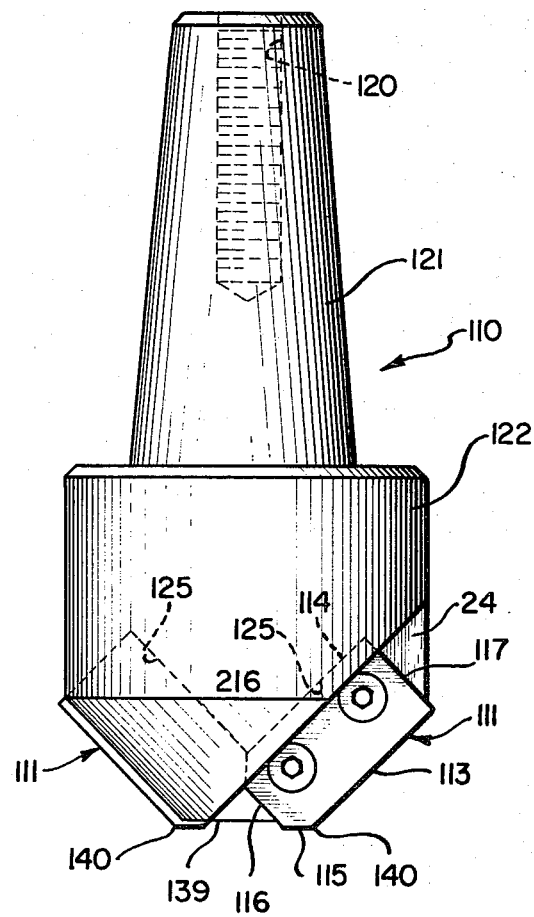
FIG. 7 is a side view of the embodiment of FIG. 6.

In this two-insert embodiment, the holder 110 has a radius at its terminal end 139 sufficient to accommodate no more than two inserts 111, 111, and the holder has only two seating surfaces 24, 24 and two locating recesses 125, 125. The two locating recesses 125, 125 are spaced apart 180° and converge toward each other, abutting at the axis of holder 110 somewhat above terminal end 139 of holder 110. If the locating recesses were extended all the way to terminal end 139, they would theoretically intersect or overlap each other which is not practicable. In the embodiment of FIGS. 6-7, the radius at the terminal end 139 is too short to accommodate a termination of the locating recesses at the terminal end. (This is in contrast to the embodiment of FIGS. 1-5 wherein the terminal end 39 has a larger radius enabling it to accommodate a termination of three locating recesses 25 without intersection or overlapping.) Because, in the embodiment of FIGS. 6-7, the locating recesses abut at the axis of holder 110, above terminal end 139, the holder can only accommodate two locating recesses and, accordingly, only two inserts.

It is necessary to abut the locating recesses above the terminal end of holder 110 in order to assure that the outer extremities 140, 140 of the forward end portions 115, 115 of the two inserts extend radially outwardly not much further than does the periphery of terminal end 139. If the locating recesses were to be extended all the way to terminal end 139 without abutting (so as to accommodate more than two recesses), these recesses would have to be positioned radially outwardly of the positions shown in FIG. 7, and, if a cutting insert 111 of the same size as shown in FIG. 7, were mounted in a locating recess so positioned, the outer extremity 140 of the insert's forward end portion 115 would extend radially outwardly much further than the periphery of holder 139; and, in such a case, the tool might not fit into the hole to be countersunk. With the arrangement illustrated in FIGS. 6-7, the holder 110 with inserts 111, 111 assembled thereon will fit into virtually any hole in which the holder alone would fit. But, as noted above, this arrangement limits to two the number of inserts which can be accommodated on holder 110.

However, for a hole of the size to be countersunk by the tool of FIGS. 6-7, two inserts are adequate to prevent chattering of the tool during the countersinking operation and to provide a good, clean finish on the countersunk hole. The two-insert tool of FIGS. 6-7 can be used to countersink a hole having a beginning or starting diameter of one to two inches and a finished diameter of two to three inches, for example.

Referring to insert 111, it comprises an outer cutting edge portion 113, an inner end portion 114 and a forward end portion 115 (previously described). Located between forward end portion 115 and inner end portion 114 is a first connecting portion comprising connecting parts 116 and 216, and located between cutting edge portion 113 and inner end portion 114 is a second connecting portion 117. Each insert 111 is cut away back to connecting parts 116, 216 for the same reason as insert 11 is cut away to connecting part 16 (described above). The cut aways on the two inserts overlap.

As shown in FIGS. 6-7, the connecting parts 216, 216 on the two inserts abut, and the respective flat surfaces 119, 119 on each insert overlap, each surface 119 being located slightly ahead (in the direction of rotation) of a plane parallel to surfaces 119, 119 and passing through the axis of holder 110. This permits each insert's cutting edge, defined by surface 119 and outer portion 113, to be reground without trailing the axial plane, described in the preceding sentence, after regrinding.

In the embodiments of both FIGS. 1-5 and FIGS. 6-7, there are certain relationships among the various structural features. These relationships will be described primarily with respect to the embodiment of FIGS. 1-5, but they are also applicable to the embodiment of FIGS. 6-7. More specifically, the length of cutting edge portion 13 is less than the length of inner end portion 14. The angle at 40, i.e., the junction of cutting edge portion 13 and forward end portion 15, is equal to the angle at 42, the junction of first connecting portion 16 and inner end portion 14.

The junction 41 of the extensions of the forward end portion and inner end portion 15, 14 respectively, lies on the opposite side of the holder's axis from the junction 40 of cutting edge portion 13 and forward end portion 15. In addition, the junction 43 of first connecting portion 16 and forward end portion 15 as well as the junction 42 of first connection portion 16 and inner end portion 14 both lie on the same side of the holder's axis as the junction 40 of cutting edge portion 13 and forward end portion 15. The relationships described in the preceding portion of this paragraph occur when insert 11 is mounted on holder 10 with the insert's inner end portion 14 seated on locating surface 25 and the insert's forward end portion 15 located at terminal end 39.

Referring to FIGS. 1 and 3, shank 21 of holder 10 may be secured to a machining head or driving means for the holder by conventional gripping means. In the embodiment of FIGS. 6-7, holder shank 121 is tapered and is internally threaded at 120 for attachment to an externally threaded member on a machining head or driving means (not shown) for holder 110. In an alternative embodiment (not shown), the cylindrical portion of the holder may be internally threaded, along the axis of the holder to facilitate attachment to a machining head or driving means. In such a case, shank 21 or 121 would be eliminated, and the internally threaded cylindrical portion would be secured to the threaded end of a shank which in turn would be attached to a machining head. Internal threading of the cylindrical portion permits the holder to be used with many different kinds of shanks.

To accommodate a plurality of inserts in the manner illustrated in the figures, wherein the locating recesses for the inserts converge toward and abut adjacent the axis of the holder, it is necessary to avoid having a pilot projecting axially from the holder at its terminal end. Accordingly, pilots are dispensed with in tools constructed in accordance with the present invention. If a pilot were provided, the locating recesses would have to terminate radially outwardly from where they terminate in the embodiments shown in the figures. This, in turn, would require a holder having a larger diameter at its terminal end, and this larger diameter could be too big to enter the hole which is to be countersunk. Eliminating the pilot also avoids a problem which occurs when the hole to be countersunk has been internally threaded. In such cases, the pilot can rub against the internal threads and this is undesirable.

The foregoing detailed description has been given for clearness of understanding only, and no unnecessary limitations should be understood therefrom, as modifications will be obvious to those skilled in the art.

I claim:

1. In combination, a rotatable holder and a plurality of cutting inserts for use with said holder as a countersinking tool, said combination comprising:
    a frusto-conical portion on said holder;
    said frusto-conical portion tapering toward a terminal end thereof constituting the terminal end of said holder;
    a plurality of seating surfaces, one for each of said inserts;
    each of said seating surfaces being located at least partially on said frusto-conical portion;
    each of said seating surfaces lying in a plane parallel to the axis of said holder and extending inwardly from the periphery of said holder to an inner end of said seating surface;
    a locating recess at the inner end of each seating surface;
    each insert having a body, a cutting edge portion and an inner end portion opposite and spaced from said cutting edge portion;
    said locating recess comprising means for receiving said inner end portion of an insert and for cooperating with said seating surface to mount said insert on said holder;
    each locating recess comprising a locating surface disposed angularly to said seating surface and joining the latter along an interior edge;
    said inner end portion of the insert comprising means for seating on said locating surface;
    said recesses and their respective locating surfaces converging toward each other with said recesses meeting at said terminal end;
    said recesses terminating at said terminal end without intersection or overlapping of the recesses;
    said inserts and their respective inner end portions converging toward each other in the direction of said terminal end of the holder;
    each insert having a forward end portion adjacent said cutting edge portion and extending from the latter toward a projected junction with said inner end portion;
    said forward end portion of the insert being located adjacent said terminal end of the holder;
    said projected junctions overlapping at said terminal end;
    said holder having a predetermined radius at said terminal end;
    the distance from the junction of said cutting edge portion and said forward end portion to said projected junction being greater than said predetermined radius;
    the junction of said cutting edge portion and said forward end portion being radially spaced from the axis of said holder;
    each insert being cut-away from said projected junction to accommodate the inner end portions of the inserts as they converge in said holder and to prevent said inner end portions from interfering with each other at said terminal end of the holder;
    said forward end portion of the insert having a length less than said predetermined radius.

2. A combination as recited in claim 1 wherein:
    said insert comprises a first connecting end portion between said forward end portion and said inner end portion;
    said projected junction lies on the opposite side of said holder axis from said junction of the cutting edge portion and the forward end portion, when the inner end portion is seated on said locating surface and said forward end portion is at said terminal end;
    the junction of said first connecting end portion with said forward end portion and the junction of said first connecting end portion with said inner end portion both lie on the same side of said holder axis as the junction of said cutting edge portion and the forward end portion.

3. A combination as recited in claim 1 wherein:
    said insert comprises a first connecting end portion between said forward end portion and said inner end portion;
    the length of said cutting edge portion is less than the length of said inner end portion;
    there is an angle at the junction of said cutting edge portion and said forward end portion and an angle at the junction of said first connecting end portion and said inner end portion;
    and both of said angles are equal.

4. A combination as recited in claim 1 wherein said insert comprises:
    a first connecting end portion between said forward end portion and said inner end portion;
    a second connecting end portion between said cutting edge portion and said inner end portion;
    a first flat surface comprising means for seating on said seating surface;

and a second flat surface opposite said first flat surface.

5. A combination as recited in claim 1 and comprising:
three inserts;
and three locating recesses on said holder.

6. A combination as recited in claim 1 wherein:
said locating recess comprises means cooperating with said seating surface to mount said insert in a disposition in which said cutting edge portion defines an inverted frusto-conical surface of revolution when the holder is rotated about its axis;
said frusto-conical portion of the holder defining a surface of revolution when the holder is rotated about its axis;
and the surface of revolution defined by said cutting edge portion lies outside the surface of revolution defined by said frusto-conical portion.

7. A combination as recited in claim 1 wherein:
said frusto-conical portion has a plurality of peripheral parts each adjacent a respective seating surface and each extending in an angularly trailing direction from said seating surface when the holder is rotated in a countersinking operation;
each of said peripheral parts being sufficiently indented relative to the cutting edge portion on the adjacent seating surface to accommodate axially advancing movement of said frusto-conical portion into a countersunk hole during a countersinking operation;
said combination comprises at least one detachable fastener extending through each insert and its seating surface to secure said insert to said holder;
a cut-away part extending from each seating surface in an angularly leading direction;
said cut-away part comprising means sufficiently indented from the periphery of said holder to provide access to said fastener and to facilitate chip clearance during a countersinking operation.

8. The combination of claim 1 and comprising:
a cylindrical portion extending from said frusto-conical portion and axially aligned therewith;
said cut-away part comprising a first cut-away surface for providing access to said fastener and a second cut-away surface extending from said first cut-away surface in an angularly leading direction and sufficiently indented from the periphery of said holder to provide said chip clearance;
a third cut-away surface located, in part, between said second cut-away surface and the peripheral part adjacent
said frusto-conical portion having a plurality of peripheral parts each adjacent a respective seating surface and each extending in an angularly trailing direction from said seating surface when the holder is rotated in a countersinking operation;
each of said peripheral parts being sufficiently indented relative to the cutting edge portion on the adjacent seating surface to accommodate axially advancing movement of said frusto-conical portion into a countersunk hole during a countersinking operation;
at least one detachable fastener extending through each insert and its sensing surface to secure said insert to said holder;
a cut-away part extending from each seating surface in an angularly leading direction;
said cut-away part comprising means sufficiently indented from the periphery of said holder to provide access to said fastener and to facilitate chip clearance during a countersinking operation.

9. The combination of claim 1 and comprising:
no more than three of said inserts;
and no more than three of said seating surfaces.

10. The combination of claim 1 wherein:
each recess comprises a further surface spaced from and facing said seating surface;
said combination comprises at least one detachable fastener extending through each insert and its seating surface to secure said insert to said holder;
said further surface of the recess has a dimension, in an inward direction on said holder, substantially less than the dimension of said seating surface in said inward direction and terminates inwardly of said detachable fastener;
and said further surface of the recess comprises means for engaging an inward portion of the insert mounted on the adjacent seating surface to prevent the force exerted against the insert by the workpiece undergoing countersinking from breaking the insert loose at said detachable fastener.

11. In combination, a rotatable holder and a pair of cutting inserts for use with said holder as a countersinking tool, said combination comprising;
a frusto-conical portion on said holder;
said frusto-conical portion tapering toward a terminal end thereof constituting the terminal end of said holder;
a pair of seating surfaces, one for each of said inserts;
each of said seating surfaces being located at least partially on said frusto-conical portion;
each of said seating surfaces lying in a plane parallel to the axis of said holder and extending inwardly from the periphery of said holder to an inner end of said seating surface;
a locating recess at the inner end of each seating surface;
each insert having a body, a cutting edge portion and an inner end portion opposite and spaced from said cutting edge portion;
said locating recess comprising means for receiving said inner end portion of an insert and for cooperating with said seating surface to mount said insert on said holder;
each locating recess comprising a locating surface disposed angularly to said seating surface and joining the latter along an interior edge;
said inner end portion of the insert comprising means for seating on said locating surface;
said recesses and their respective locating surfaces converging toward each other in the direction of said terminal end;
said converging locating surfaces abutting at the axis of the holder above said terminal end;
said inserts and their respective inner end portions converging toward each other in the direction of said terminal end;
each insert having a forward end portion adjacent said cutting edge portion and extending from the latter toward a projected junction with said inner end portion;
said forward end portion of the insert being located adjacent said terminal end of the holder and having an outer extremity located at substantially the periphery of said terminal end;

said projected junctions overlapping at said terminal end;

said holder having a predetermined radius at said terminal end;

the distance from the junction of said cutting edge portion and said forward end portion to said projected junction being greater than said predetermined radius;

the junction of said cutting edge portion and said forward end portion being radially spaced from the axis of said holder;

each insert being cut-away from said projected junction to accommodate the inner end portions of the inserts as they converge in said holder and to prevent said inner end portions from interfering with each other at said terminal end of the holder;

said forward end portion of the insert having a length less than said predetermined radius.

12. The combination of claim 11 wherein:

the radius of said holder at its terminal end is sufficient to accommodate no more than two inserts;

and said combination has only two of said inserts and two of said locating recesses.

13. The combination of claim 12 wherein:

said combination has only two inserts spaced apart 180°;

each insert has a flat surface extending between said inner end portion and said cutting edge portion and spaced from said seating surface by the thickness of the insert;

each of said flat surfaces being located ahead, in the direction of rotation of said tool, of a plane parallel to both of said flat surfaces and passing through the axis of said holder.

14. A combination as recited in claim 11 wherein:

each inset comprises a first connecting end portion between said forward end portion and said inner end portion;

the two first connecting end portions on said two inserts abut at the axis of said holder, the totality of said abutment being above said terminal end of the holder.

15. In combination, a rotatable holder and a plurality of cutting insets for use with said holder as a countersinking tool, said combination comprising;

a frusto-conical portion on said holder;

said frusto-conical portion tapering toward a terminal end thereof constituting the terminal end of said holder;

a plurality of seating surfaces, one for each of said inserts;

each of said seating surfaces being located at least partially on said frusto-conical portion;

each of said seating surfaces lying in a plane parallel to the axis of said holder and extending inwardly from the periphery of said holder to an inner end of said seating surface;

a locating recess at the inner end of each seating surface;

each insert having a body;

a cutting edge portion on each insert;

each insert having an inner end portion opposite and spaced from said cutting edge portion;

said locating recess comprising means for receiving said inner end portion of an insert and for cooperating with said seating surface to mount said insert on said holder;

each locating recess comprising a locating surface disposed angularly to said seating surface and joining the latter along an interior edge;

said inner end portion of the insert comprising means for seating on said locating surface;

each recess comprising a further surface spaced from and facing said seating surface;

at least one detachable fastener extending through each insert and its seating surface to secure said insert to said holder;

said further surface of the recess having a dimension, in an inward direction on said holder, substantially less than the dimension of said seating surface in said inward direction and terminating inwardly of said detachable fastener;

and said further surface of the recess comprising means for engaging an inward portion of the insert mounted on the adjacent seating surface to prevent the force exerted against the insert by the workpiece undergoing countersinking from breaking the insert loose at said detachable fastener.

* * * * *

UNITED STATES PATENT AND TRADEMARK OFFICE
CERTIFICATE OF CORRECTION

PATENT NO. : 4,293,254

DATED : October 6, 1981

INVENTOR(S) : Michael Markovics

It is certified that error appears in the above-identified patent and that said Letters Patent are hereby corrected as shown below: Claim 8 should read as follows:

-- The combination of claim 1 and comprising:

a cylindrical portion extending from said frusto-conical portion and axially aligned therewith;

said cut-away part comprising a first cut-away surface for providing access to said fastener and a second cut-away surface extending from said first cut-away surface in an angularly leading direction and sufficiently indented from the periphery of said holder to provide said chip clearance;

a third cut-away surface located, in part, between said second cut-away surface and the peripheral part adjacent the next seating surface, and also located, in part, between said second cut-away surface and the periphery of said cylindrical portion, said third cut-away surface comprising means for eliminating sharp angular edges between the surfaces adjoining said third cut-away surfaces. --.

Signed and Sealed this

Twenty-ninth Day of May 1984

[SEAL]

Attest:

GERALD J. MOSSINGHOFF

Attesting Officer

Commissioner of Patents and Trademarks